March 1, 1966   C. J. WITT ET AL   3,237,808
SUBMERGED ORIFICE PROPORTIONER
Filed June 15, 1964
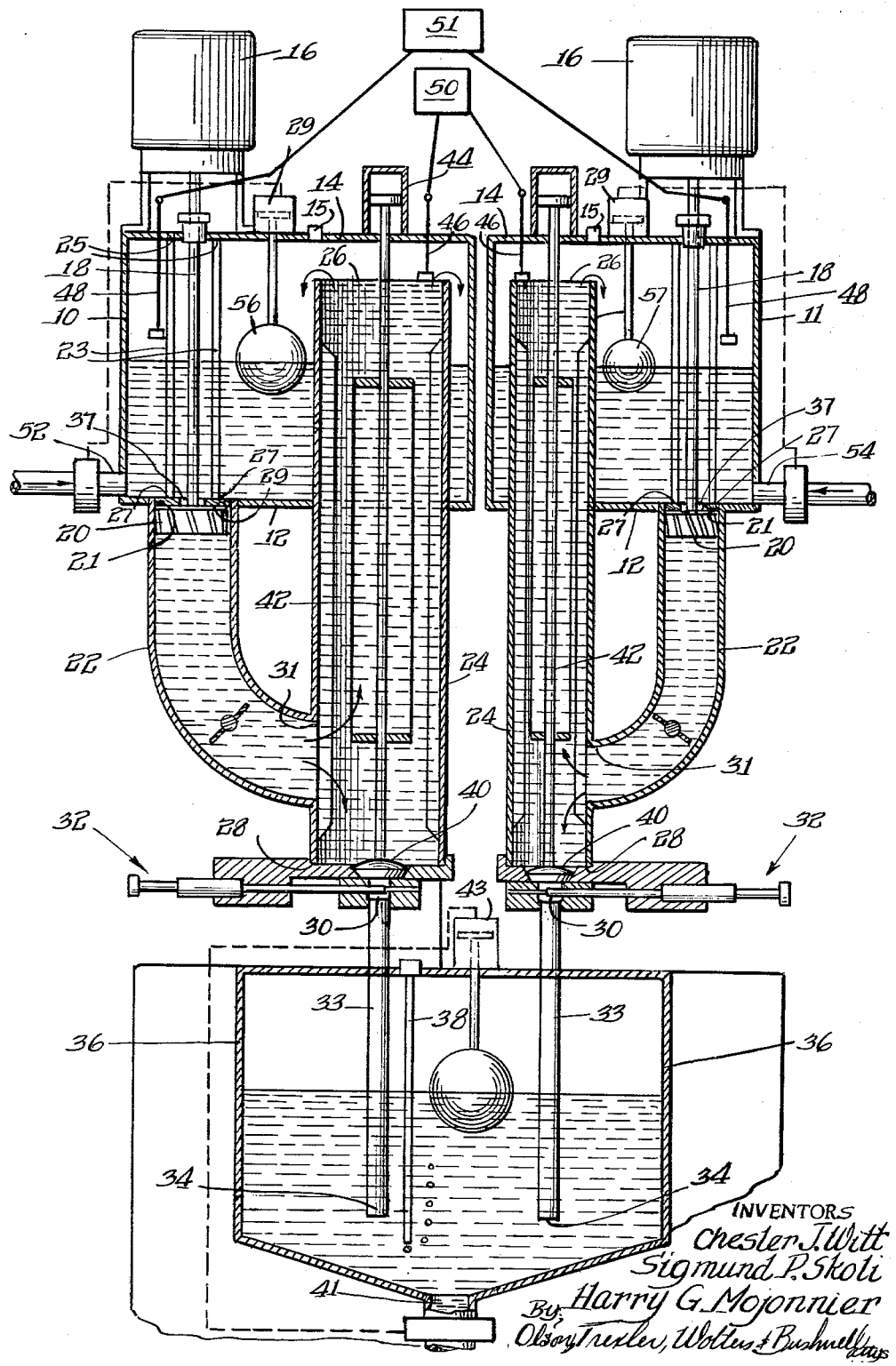
INVENTORS
Chester J. Witt
Sigmund P. Skoli
Harry G. Mojonnier
By Olson, Trexler, Wolters & Bushnell
Attys

3,237,808
SUBMERGED ORIFICE PROPORTIONER
Chester J. Witt, Deerfield, Sigmund P. Skoli, Elmwood Park, and Harry G. Mojonnier, River Forest, Ill., assignors to Mojonnier Bros. Co., Chicago, Ill., a corporation of Illinois
Filed June 15, 1964, Ser. No. 375,015
9 Claims. (Cl. 222—64)

This invention relates generally to an improved fluid proportioning apparatus to accurately proportion diverse fluids according to predetermined ratios, and more specifically relates to a novel fluid proportioning apparatus which is particularly useful in achieving accurate proportions of syrup and water in the preparation of soft drinks.

More specifically yet, the present invention is concerned with a novel and surprisingly simplified arrangement of fluid pumps to achieve more constant conditions of fluid pressure and head, and hence more constant fluid flow, through proportioning orifices to secure and maintain the precise proportions of fluids desired.

Additionally, the invention concerns a particular fluid flow arrangement in such a proportioning apparatus reducing the danger of oxidative and bacterial spoilage of a particular mix prepared from diverse fluids due to splashing, aeration, foaming, and spurting.

Prior art deficiencies

It is generally well known in the fluid proportioning art that it is desirable to maintain a constant height of fluid above a fluid outlet to reduce fluctuations in the rate of supply of the fluids to the outlet, to prevent sucking of air into the fluid outlet and to achieve a constant outlet pressure and thus maintain more exact conditions of fluid flow through the fluid outlet. Thus, prior art proportioning devices have included a vertical overflow tube of predetermined height with a fluid outlet at the bottom of the tube and means to maintain the tube in a state of fluid overflowing from the tube thereby to maintain a relatively constant head or pressure on the outlet. One of the most widely utilized means to maintain the tube in a state of overflow has been a pump to transfer fluid from a source to the tube.

Unfortunately, the overflow pump itself created problems. For instance, positioning of the pump and its requisite motor was usually very awkward, both from a design standpoint and from a functional standpoint requiring additional base mounting facilities, additional fittings and make-shift insertions of the pump impeller at locations as convenient as possible in a separate fluid tank, within a lead line from the fluid source to the overflow tube or within the tube itself.

Another problem experienced in prior art fluid proportioners was that of foaming of the fluids in the mixing stage, that is, the rate of flow of fluids discharged into a blending or mixing tank through particular fluid orifice settings was such that foaming resulted. Foaming is undesirable since it tends to bloat the fluids resulting in an uneven flow of fluids from the mixing stage and an uneven filling of containers to be filled.

In conventional proportioners, a vertical overflow tube would be positioned partially within the proportioner with a fluid orifice or outlet located at the bottom of the tank opening into a top plate of a fluid blending tank. While this arrangement was satisfactory with specific fluids at specific flow rates, where the fluid characteristics were changed or where the rate of flow was greatly increased or where other relatively minor modifications were made, an unacceptable product resulted.

For instance, frequently in the proportioning, blending and bottling of non-carbonated beverages, the syrup and water passing from the bottom overflow tube outlet into a blending tank would spurt, splash and become aerated, resulting in an objectionable tendency for foaming of the blended beverages in filling the individual soft drink bottles.

In the proportioning blending and bottling of lightly carbonated beverages, aeration and spurting as above frequently led to bacterial spoilage of the mix.

It is therefore an object of the present invention to provide an improved fluid proportioning apparatus wherein a simplified more sanitary flow and mounting arrangement is provided for means maintaining an overflow tube in overflow condition whereby complicated housing arrangements are obviated and wherein a more constant static head of pressure is maintained on a fluid orifice to achieve a smoother, more precise continuous flow of fluids through the orifice.

It is another object of the invention to provide a novel submerged fluid discharge orifice means leading from the fluid proportioner to a fluid blender or mixing tank to achieve a smooth, continuous flow of fluid into the blender and to avoid spurting, splashing, foaming, and aeration of the fluids and the resultant mix.

These and other objects of the invention will be apparent as the detailed description of the invention proceeds.

The objects of the present invention have been achieved by a full recognition of all the problems associated therewith, the improved fluid portioning apparatus of the present invention successively coping with these associated problems. In brief, the present invention comprises a pair of juxtaposed fluid containers having fluid discharge openings in their bottoms. A vertical overflow column is situated partially within the fluid containers with an open top portion for continuous fluid overflow therefrom to maintain a constant fluid head above a discharge orifice at the bottom of the overflow column. A recirculating centrifugal pump is vertically positioned within the container with an impeller positioned in a bottom opening in the container leading into a passageway leading to a lower portion of the overflow column, the pump being positioned to have a constant level of fluid above the impeller to avoid the possibility of cavitation and variations in fluid pressure; and to maintain a constant fluid pressure and velocity at the overflow column orifice to maintain a constant flow of fluid through the orifices.

A proportioning orifice with suitable regulating controls to precisely regulate a continuous proportioned flow of fluids from the two overflow columns is provided, with novel means leading from the orifice to a receiving container positioned immediately below the overflow columns to receive the separately proportioned fluids from the separate overflow column orifices.

The means leading from the proportioning orifice comprises a conduit having a discharge end, connected to the bottom portion of the receiving container, being operatively submerged below the level of fluids within the receiving container. The unique submerged position of the discharge end provides a smooth continuous relatively laminar flow of fluids into the receiving container, avoiding problems of spurting, splashing, foaming, aeration and consequent spoilage of the fluids within the container.

*Detailed description*

The present invention and its advantages will be better understood from the following detailed description, including the accompanying drawing wherein like numerals have been used to designate similar parts. The drawing is a schematic cross sectional elevation view of the invention illustrating two separate but juxtaposed fluid tanks, each having an open-top overflow column with a bottom opening in each for discharge of the fluids from the overflow column, in specific predetermined proportions into a lower receiving container where mixing or blending means may be provided.

The drawing shows a pair of tanks 10, 11 being separate but juxtaposed. Tanks 10, 11 each have a bottom 12 and a top 14, the top of each tank having air fittings 15 or being relatively loosely fitted to the supporting structure to maintain fluids within the tank at atmospheric pressure, the top also having suitable conventional mounting provisions and cleaning openings. A motor 16 is seen mounted on each of the tanks 10, 11 driving a pump shaft 18 to operate a centrifugal recirculating pump positioned directly below the motor at the bottom of the fluid tank and having an impeller 20 positioned advantageously immediately below an opening 21 in the tank bottom, fixedly centered in a passageway 22 connected to the tank bottom and leading from the opening in the bottom of the tank to a lower portion of an overflow column situated partially within the tank.

A vertical overflow tube or column 24 is seen to be positioned partially within each fluid tank 10, 11 having an open overflow end 26 open to the atmosphere within the tank; and a lower or bottom fluid discharge end 28 spaced apart from and below the bottom of the tank with suitable openings provided at the bottom end for discharge of fluids into a separate lower fluid receiving tank.

As is clear from the drawings, the impeller 20 pumps fluid from the fluid tanks 10, 11, where fluids are maintained at a predetermined level by suitable conventional fluid level maintenance means such as a float operated valve 29 downwardly through passageway 22 into overflow column 24. Passageway 22 comprises a tube or conduit secured to the overflow column opening into a port 31 in the side of the column, the fluid moving singly or simultaneously upwardly and downwardly respectively through port 31 into the column and then upwardly and downwardly through one or both of the open upper overflow end or the bottom fluid discharge end of the column.

The impeller is centered in the passageway by means of three vertical cage rods 23 which encircle the impeller, the rods having upper ends 25 which are secured to the top 14 of the tanks. Lower ends 27 of the cage rods are secured to an impeller ring 29 which is adapted to fit snugly within passageway 22, ring 29 being fastened to the tank bottom 12 and holding the impeller about one-half inch below the tank bottom. Ring 29 has an eye 37 through which fluids from the tanks move into the passageway.

An orifice 30 is mounted in the discharge end of the overflow column with conventional flow rate adjustment means 32 provided for adjusting the fluid flow, such as by changing from one fixed orifice to another.

A fluid tubing 33 is connected to the orifice 30 at one end with a discharge end 34 opening into a lower portion of a separate lower fluid receiving tank or container 36 to receive diverse fluids, the fluids alternatively being blended or mixed therein as a normal function of the flow of fluids into tank 36.

A bubbler tube 38 is positioned within the receiving tank 36 having a lower discharge end for discharging of $CO_2$ within the tank, the upper end of the bubbler tube being connected to a carbonating tank regulator valve which provides a continuous source of $CO_2$.

A shutoff plunger 40, is provided within each overflow column having a piston arm 42 connected to an air cylinder or pneumatic motor 44 mounted on the top of the fluid tank. Motor 44 operating each plunger, 40, 41 respectively, is actuated by electrical probes 46 positioned at the upper end 26 of the overflow column 24 and probes 48 in each of the tanks 10, 11. The probes 46 are connected to a relay 50 to energize the motors and simultaneously actuate plungers 40, 41 to close the openings at the bottom of both overflow columns simultaneously whenever fluid is not overflowing from the top of both columns. Probes 48 are connected to a relay 51 to shut down the entire system when the level of fluid in the tanks rises abnormally to contact probes 48.

In the embodiment of the invention here provided a fluid tank 10 in the left-hand portion of the drawing is utilized as a water tank, an inlet 52 being seen at the left-hand side of the tank for receipt of a supply of filtered water. The fluid tank 11 at the right-hand side of the drawing is utilized to contain syrup such as required in making soft drinks, an inlet 54 for syrup being provided at the right-hand side of the syrup tank. A pump, not shown, maintains a supply of water and syrup to the two tanks 10, 11, the pump being controlled automatically by float operated valves or air switch 29 and floats 56, 57 respectively acting responsive to changes in fluid level from a predetermined level within the tanks.

Lower receiving tank 36 has a lower outlet 41 which may discharge into a carbonating tank, a bottle-filling apparatus, or a mixing chamber, as desired, suitable means, not shown, being provided to withdraw syrup and water from tank 36. A conventional float actuated air switch 43 is provided in the receiving tank to control the flow of fluids from outlet 41, the switch controlling a pneumatic modulating valve, not shown, to actuate a centrifugal pump, not shown, to draw fluids from the tank responsive to the level of fluids in the tank.

Having now described the invention structurally, it is advantageous to provide at this time a functional description of the invention.

*Mode of operation*

Water and syrup are supplied to separate but juxtaposed fluid tanks, the level of fluids within the tanks being maintained with a predetermined level. The means to maintain the fluids within the tanks at such predetermined level may be any conventional level control device such as a float within the tank or electrical probes within the tank responsive to the level of the fluids therein to supply water and syrup to the tanks. The water and syrup in the tanks are continuously recirculated, being pumped downwardly from the tank by a pump with an impeller located below a discharge opening in the bottom of the tank. A motor for driving the pump is positioned directly above the fluid tanks mounted on the top portion of the tanks with a drive shaft being positioned vertically to operate the pump impeller.

The fluids are pumped downwardly from the fluid tanks into a passageway leading to a vertical overflow column which is positioned with an upper portion within the fluid tanks and a lower portion below the tanks. The overflow columns have an open upper overflow end, the columns being maintained completely filled with fluids, that is, in a state of overflow by the recirculating pump. The fluids overflow from the overflow column, merely falling downwardly into the fluid tanks to be recirculated by the pump to the overflow column.

Thus, a continuous circuit or flow of fluid is maintained within the fluid tanks directed downwardly to a passageway to the overflow column, upwardly to the upper overflow end of the column end then out again into the fluid container. A proportioning orifice is located at an open lower end of the overflow column with fluids flowing from the overflow column downwardly through a proportioning orifice into a lower receiving tank where water and syrup from the two upper tanks are joined. As is clear, the purpose of the overflow column is to maintain a constant height or head of fluids above the proportioning orifice located at the lower end of the column, each impeller being continuously operated to maintain each overflow column in a state of overflow ensuring a constant uniform flow of fluids through the orifice.

The recirculating pumps to maintain the fluids in a state of overflow are uniquely positioned directly within the fluid tanks thereby obviating separate pump housings, separate gaskets and fittings for an exteriorly positioned pump. The unique position of the pump ensures easier maintenance of the pump since it may be cleaned in one operation with the fluid tank. Separate cleaning means, not shown, are provided in each of the tanks for flushing or cleaning them out and may take the form of a hot water spray with suitable chemical additives to completely clean the fluid tanks, recirculating pumps, overflow column and fluid orifice in one operation.

The pump impeller is positioned immediately below the tank bottom in a passageway leading to the overflow tank. This particular position ensures a continuous constant level of fluids over the pump impeller. The rotating impeller creates some turbulence; however, this is muffled to a great extent by the position of the impeller within the passageway beneath the tank; and the tubulence is insufficient to create a vortex of fluids about the impeller. Thus, cavitation or sucking of air by reason of insufficient fluids over the impeller is avoided since fluctuations in fluid level within the tanks due to impeller rotation are minimized. Cavitation or sucking of air is particularly undesirable since it causes aeration and bloating of the fluids and leads to an irregular flow of fluids through the orifice.

The unique placement of the impeller at the upper end of the passageway leading to the overflow tank has been found to result in optimum impeller efficiency, thus ensuring a continuous flow of fluids from the overflow column. Use of an overly large impeller requiring greater power is thus avoided and a relatively smooth flow of fluids from the tanks to the overflow columns is maintained.

By maintaining the impeller about one-half inch below the bottom of the fluid tanks in the passageway leading to the overflow columns a substantially constant pressure is maintained on the orifice by reason of a smooth continuous overflow of the fluids from the upper end of the overflow column and hence a constant head of fluid above the orifices.

Conventional means are provided for adjusting the orifice leading downwardly from the overflow columns; however, instead of a customary direct opening from the overflow column orifice into the top of a receiving tank, the invention contemplates a separate fluid tube or supply line leading down into the receiving tank with a submerged discharge end near the bottom of the receiving tank to provide a submerged discharge opening for the fluids. In this case water and syrup are discharged into the receiving tank at a lower portion below the level of fluid in the tank.

The level of fluids in the receiving tank is maintained at a constant predetermined level by a conventional float operated valve with float positioned within the tank. The discharge opening is positioned about an inch and a half from the bottom of the receiving tank; and the level of fluids within the tank is maintained about four inches above the tank bottom with a minimum of about an inch and a half of fluid above the discharge opening to ensure the fluids discharged do not pick up air from the tank atmosphere. There is some rolling action of the fluids discharged which contributes to a mixing and blending of the fluids thus reducing or eliminating the need for conventional mixing baffles within the tank.

Unexpectedly, it has been found that with the discharge end or orifice at a lower, submerged position in the receiving tank, an almost complete elimination of the usual phenomena of foaming, spurting, and aeration of the fluids is achieved, avoiding oxidative and bacterial spoilage of the fluids since the fluids do not have an opportunity in passing through an atmospheric zone to pick up air. A bubbler tube continuously supplying $CO_2$ to the receiving tank ensures that the fluids within the receiving tank are maintained in a slightly carbonated atmosphere, thus further avoiding the possibility of aeration.

A shutoff plunger is positioned in the overflow column with conventional means provided to completely close the orifice at the bottom of the overflow columns when fluids within the tanks fall below or rise above predetermined levels; or when the fluids are not in a state of overflow from the overflow columns.

Thus, it is seen that the objects of the invention have been achieved by exceptionally simple means. Means have been provided in the invention simplifying the overall proportioning apparatus structure, eliminating the necessity for a separate pump housing, mounting brackets, fitting and the like; preventing cavitation and irregularity in flow of fluids from a flow column discharge orifice. The unique arrangement of the invention has resulted in precisely maintained proportions of fluids continuously and simultaneously discharging into a receiving tank.

The novel arrangement of the fluid lines leading from the overflow column discharge end into a receiving tank with an outlet or orifice at a submerged position well below the level of fluids in the tank eliminates the necessity for various mixing baffles heretofore provided, and eliminates the possibilities of spoilage of the fluid mix by aeration, ensures a relatively smooth, slightly rolling flow of the fluids into the receiving container thus promoting blending of the fluids in the receiving tank; avoids uneven filling of bottles in subsequent stages due to aeration and bloating; and most importantly results in precisely maintained proportions of fluids.

Since many modifications of the invention may be made by those skilled in the art, the invention should not be limited thereto; and it is thus intended by the appended claims to cover all such modifications as fall within the true spirit and scope of the invention.

The invention is hereby claimed as follows:

1. In a fluid proportioning apparatus to accurately and continuously proportion diverse fluids, said apparatus including a pair of adjacent fluid tanks to contain fluids each of said tanks having sides and a top and a bottom secured to the sides, the bottom having a fluid discharge opening therein to discharge fluid, an overflow column secured within the tank, said column having an open upper overflow end and having a lower discharge end, said column having a fluid inlet adjacent and above the lower discharge end; a passageway having an upper and a lower end with the upper end secured to the tank bottom in line with said bottom discharge opening, the lower end secured to the overflow column at its lower end and leading into the fluid inlet in the overflow column above the lower discharge end of said column; shutoff means to open and close the lower discharge end of the column simultaneously in both tanks responsive to the level of fluid in both overflow columns and the level of fluid in both tanks; means connected to separate sources of fluids to maintain the level of fluids within said tanks above a predetermined level; an adjustable orifice in one of said tanks and a fixed replaceable orifice in the other tank, said orifices being positioned in line with and immediately below said column lower end to regulate the rate of flow of fluids downwardly from said column; flow means to cause a flow of fluids from said fluid tanks downwardly through said passageway and into said overflow column to maintain said column in a state of overflow; the improvement in such apparatus wherein said flow means for each tank comprises a drive motor mounted on the top of said tank; a vertically extending rotatable drive shaft having an upper and a lower end, said upper end attached operatively for rotation to said motor, said shaft extending vertically downwardly in said tank and having its lower end positioned centrally within the discharge opening of said tank, a recirculating centrifugal pump mounted within each tank at the tank bottom and being positioned below the level of fluid within said tank, said pump having a rotatable impeller, said pump being operatively connected to said lower end of said drive shaft for rotation of said impeller, said impeller being mounted for rotation directly within the upper end of said passageway to said overflow column to effect a flow of fluids downwardly into said passageway from said tank, said pump maintaining a continuous flow of fluids upwardly in said column to maintain the fluids in a state of overflow from said column, said pump maintaining a relatively constant pressure downwardly at said overflow column discharge end whereby fluids discharging through said orifice at said column lower end flow downwardly at a precisely proportioned uniform rate of flow.

2. The improved fluid proportioning apparatus of claim 1 wherein said pump impeller is mounted for rotation within said upper end of said passageway about one-half inch below the tank bottom and wherein a tank inlet for fluids supplying fluids to the tank is maintained substantially above the impeller but below the level of fluids in said tank.

3. A fluid proportioning and combining apparatus to continuously proportion and join diverse fluids in precisely predetermined proportions comprising a first fluid proportioner comprising: a first fluid tank to contain a fluid having sides and a bottom and a top secured to the tank sides, said tank being open to the atmosphere and having an inlet for fluid positioned at its side, the bottom having a fluid discharge opening therein to discharge fluids; an overflow column secured to the tank bottom and being positioned partially within the tank and partially protruding dependingly from the tank bottom, said column having an upper overflow end and having a lower discharge end positioned below the tank, said column having a fluid inlet adjacent the lower discharge end; a passageway having an upper and a lower end with the lower end secured to the tank bottom in line with said bottom discharge opening, the lower end secured to the overflow column at its lower end and leading into the fluid inlet in the overflow column at a point above the lower discharge end of said column; means to seal and to open the lower discharge end of the column responsive to the level of fluid in said overflow column with respect to a predetermined level; supply means connected to sources of fluid to maintain the level of fluid within said tank above a predetermined level; an adjustable orifice in one of said tanks and a fixed replaceable orifice in the other tank, said orifices being positioned in line with and immediately below said column lower end to regulate the rate of flow of fluids downwardly from said column; a recirculating pump mounted within said tank below the level of fluid therein to effect a flow of fluids downwardly into said passageway from said tank, said pump having an impeller positioned within said passageway said impeller being driven to move fluids from said fluid tanks downwardly through said passageway and into said overflow column to maintain said column in a state of overflow; a second fluid proportioner substantially identical to said first proportioner for a second fluid, said second proportioner being mounted on said first tank; a third fluid receiving tank having a bottom and top secured to sides of said tank to receive fluids from said first and second fluid proportioners, said receiving tank being secured to and immediately below said proportioners, a pair of fluid supply lines having upper and lower ends said upper ends being secured to said proportioners and leading respectively from said first and second fluid proportioner orifices to a lower portion of said receiving tank, said lower ends being positioned opening into said receiving tank above the bottom of said proportioner, said lower end being positioned below a predetermined level of fluids in said receiving tank; and means to maintain fluids in said receiving tank at a predetermined level.

4. A fluid proportioning apparatus to accurately and continuously proportion diverse fluids, said apparatus comprising a pair of adjacent fluid containers each having a bottom with a fluid discharge opening therein; an overflow column secured to the tank protruding dependingly from the tank bottom, said column having an open upper overflow end, a lower discharge end, and a fluid inlet adjacent the discharge end; a passageway leading from the tank bottom into the fluid inlet; means to open and close the discharge end of the column responsive to the level of fluid in said overflow column; means connected to separate sources of fluids to maintain the level of fluids within said tanks above a predetermined level; an adjustable orifice positioned immediately below said column lower end to regulate the rate of flow of fluids downwardly from said column; flow means to cause a flow of fluids from said fluid tanks downwardly through said passageway and into said overflow column to maintain said column in a state of overflow, said flow means being mounted within said tank below the predetermined level of fluids in the tank to avoid cavitation and being positioned partially within the upper end of said passageway to effect a smooth, continuous flow of fluids downwardly into said passageway from said tank.

5. The apparatus of claim 4 including means to maintain a uniform pressure at said overflow column lower end.

6. The apparatus of claim 4 in combination with a lower fluids receiving container secured to said pair of adjacent fluid containers and positioned below said overflow column including supply means connected between said adjustable orifices and said lower container to maintain a flow of fluids from said pair of adjacent containers when said orifices are open into said lower container at a position below the level of fluids in said lower container.

7. Apparatus for mixing beverage fluids in predetermined proportion comprising: a syrup column having an overflow orifice open to the atmosphere and having a discharge orifice spaced below said overflow orifice; a syrup supply unit delivering a flow of syrup to said column; a water column having an overflow orifice open to the atmosphere and having a discharge orifice spaced below its overflow orifice; a water supply unit delivering a flow of water to said water column; a valve for each of said discharge orifices; a sensor arrangement responsive to the level of fluid in each of said columns for operating said valves to open said discharge orifices when fluid is present in said columns at predetermined levels and for closing said discharge orifices when the fluid in either of said columns falls below the predetermined level; and a mixing arrangement underlying said columns for receiving the flow from each of said discharge orifices and for combining said flows into a substantially uniform mixture, said mixing arrangement including a mixing tank, a flow control arrangement for maintaining a minimum fluid level in said mixing tank, and separate conduit means leading respectively from said discharge orifices to said mixing tank at positions beneath said minimum fluid level.

8. Apparatus according to claim 7 wherein said mixing tank comprises a substantially closed vessel and wherein said mixing arrangement further includes a gas line supplying inert gas to said vessel.

9. Apparatus according to claim 7 wherein said flow control arrangement includes a discharge valve for controlling the exit of mixed fluid from said mixing tank and a level responsive unit connected to said discharge valve and including a level sensing member disposed in said mixing tank, said level responsive unit regulating said discharge valve in accordance with the level sensed by said sensing member.

References Cited by the Examiner
UNITED STATES PATENTS

| | | | |
|---|---|---|---|
| 1,330,994 | 2/1920 | Winkley | 222—318 |
| 1,836,893 | 12/1931 | Austin | 222—66 X |
| 2,724,581 | 11/1955 | Pahl et al. | 222—318 X |
| 2,787,402 | 4/1957 | Steiner et al. | 222—318 X |
| 3,107,034 | 10/1963 | Dunnous | 222—145 X |

LOUIS J. DEMBO, *Primary Examiner.*

HADD S. LANE, *Examiner.*